Oct. 17, 1939.　　　H. E. CARNAGUA　　　2,176,202
OVERDRIVE TRANSMISSION
Filed Oct. 7, 1936　　　3 Sheets-Sheet 1

Inventor:
Harold E. Carnagua.
By Edward C. Fitzhugh
Atty.

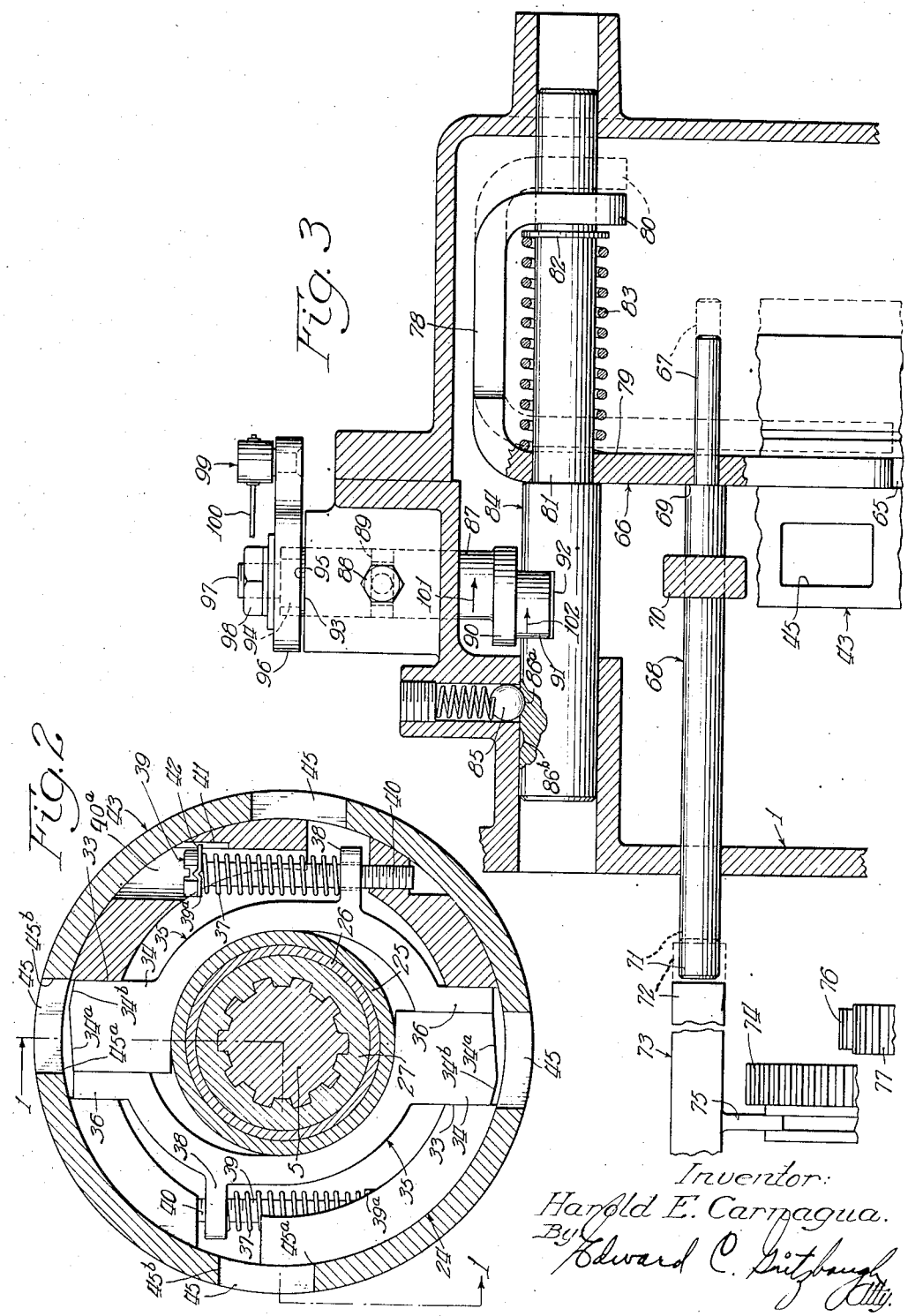

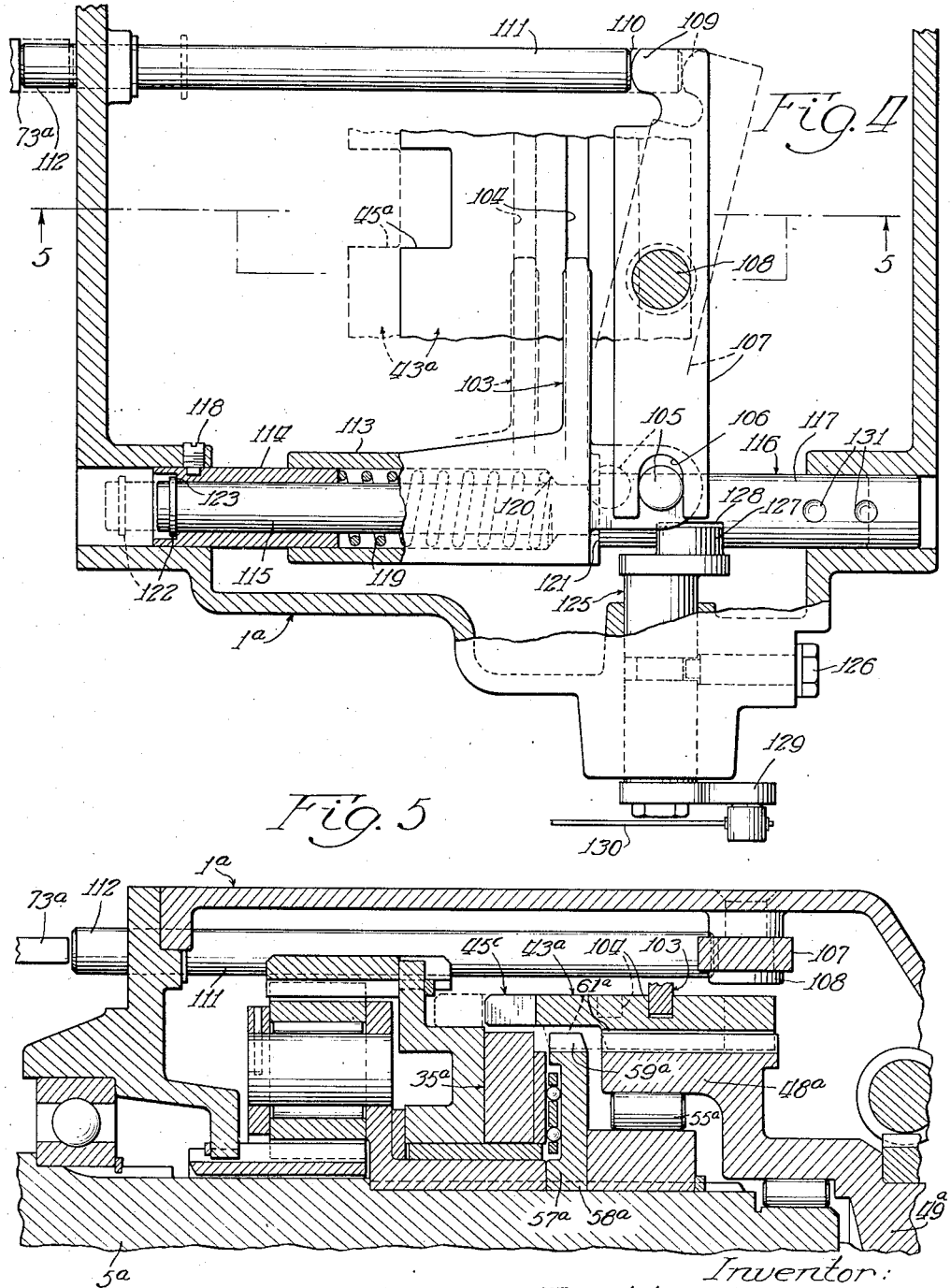

Patented Oct. 17, 1939

2,176,202

UNITED STATES PATENT OFFICE 2,176,202

OVERDRIVE TRANSMISSION

Harold E. Carnagua, Muncie, Ind., assignor to Borg-Warner Corporation, Chicago, Ill., a corporation of Illinois Application October 7, 1936, Serial No. 104,360

8 Claims. (Cl. 74—260)

This invention relates to an improved overdrive mechanism by which a drive member is enabled to drive a driven member at a greater speed than the drive member, and to means for controlling the overdrive connection between said members.

It is an object of the invention to provide shiftable overdrive control means independent of the drive shaft for locking out the overdrive connection.

It is another object of the invention to provide an overdrive control which does not require shift of the drive shaft.

Another object of the invention resides in the provision of an overdrive control which does not require shift of either the drive shaft or the driven shaft.

A further object of the invention is to provide an overdrive control member automatically shiftable independently of the drive shaft into overdrive lockup position upon shift of an associated change speed transmission into reverse gear.

It is also an object of the invention to provide an overdrive construction including a free wheel clutch with shiftable means mounted independently of the driving member of the free wheel cam for controlling the overdrive connection.

Another object of the invention is to provide an overdrive transmission with a shiftable control member forming an element of the overdrive clutch.

It is a further object of the invention to provide in an overdrive transmission a manually and automatically operative lockup clutch forming a salient part of an overdrive clutch.

A further object of the invention is to provide a structure having the above and other features, which will minimize cost of construction and assembly and will provide a compact structure which will operate with a minimum of noise and vibration.

Other objects and advantages of the invention will appear as the description proceeds.

The invention, in preferred forms, is illustrated in the accompanying drawings, in which:

Fig. 2 is a transverse view, partly in section and partly in elevation, taken substantially as indicated by the line 2—2 in Fig. 1.

Fig. 3 is a fragmentary plan view, partly in section, showing details of the shifting mechanism, employed in the structure of Fig. 1 and taken substantially as indicated by the line 3—3 in Fig. 1.

Fig. 4 is a view similar to Fig. 3 but of a modified construction.

Fig. 5 is taken substantially as indicated by the line 5—5 in Fig. 4.

Figure 1:
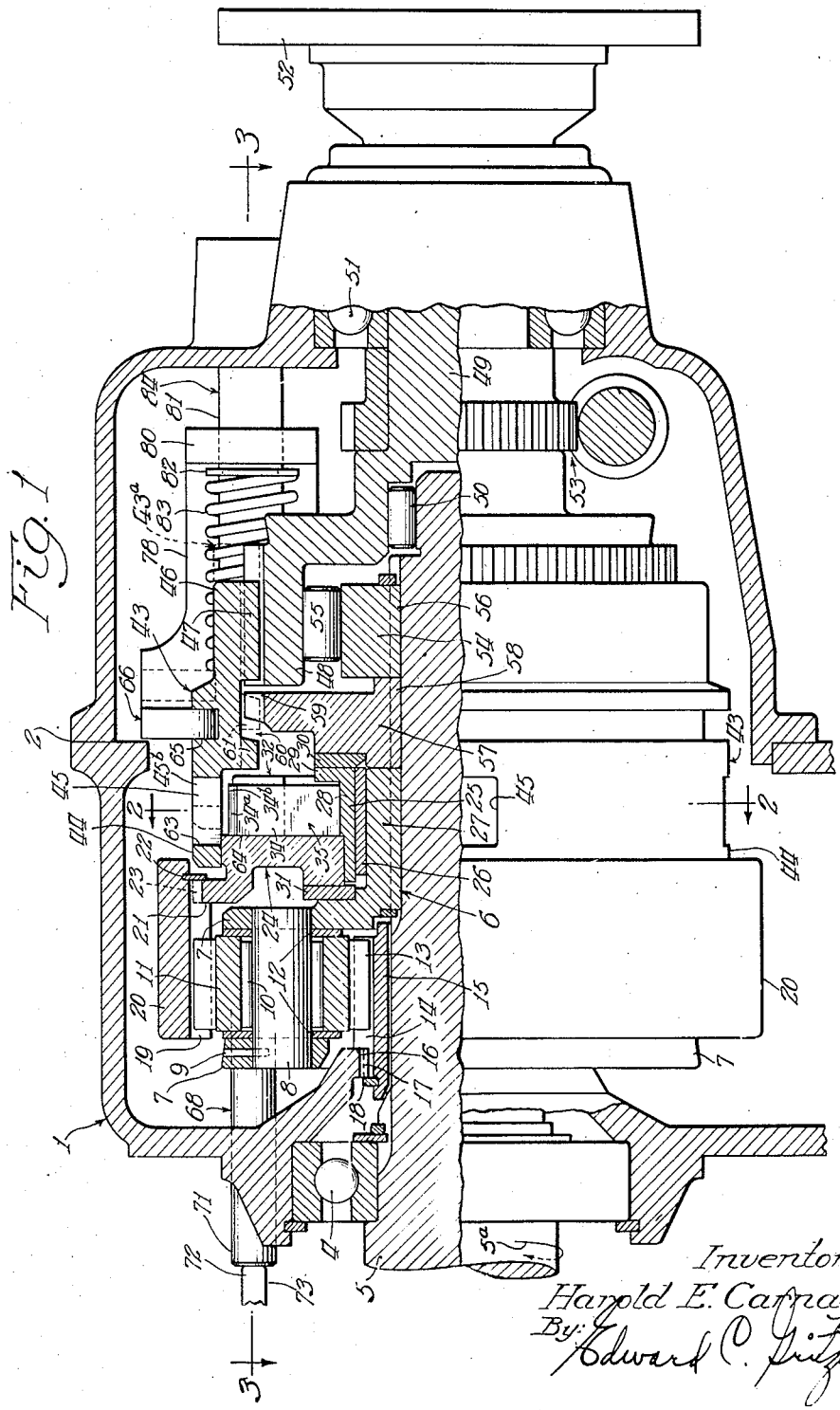
Fig. 1 is a longitudinal fragmentary view, partly in section and partly in elevation, of a power transmitting mechanism embodying one form of the invention, and is taken substantially as indicated by the line 1—1 in Fig. 2.

Referring now particularly to the drawings, there is illustrated generally at 1 a casing adapted to be bolted or otherwise secured to the rear end of a conventional or other speed-change mechanism such as finds use on motor vehicles, although it is to be appreciated that the invention may be embodied in a unit complete in itself in the casing 1, irrespective of the presence or absence of other transmission mechanism. The casing 1 may conveniently comprise sections suitably bolted or otherwise connected together as at 2.

Journaled in the casing at 4 is a shaft 5 sometimes hereinafter referred to as the drive shaft of the unit illustrated in Fig. 1 and sometimes referred to as the transmission main shaft forming a salient part of a conventional or other speed-change transmission. The shaft 5 preferably extends a substantial distance into the casing 1 and, splined thereto, is a planetary gearing pinion cage 6 having spaced flanges 7 which are suitably united by means not shown. The number of pinion gears carried by the cage 6 may be varied as desired, three spaced apart 120° having been found suitable. Each pinion shaft 8 is fixed by a key 9 in bores in the flanges 7 as shown in Fig. 1 and carries therebetween bearing rollers 10 rotatably supporting the planet gear or pinion 11. Thrust washers 12 for the ends of the pinion are provided.

Each pinion 11 has its teeth 13 arranged to mesh with the peripheral teeth 14 of a relatively stationary sun gear 15 disposed in substantially coaxial relation to the shaft 5. The gear 15 is preferably free of the shaft 5 and has its teeth at the forward portion thereof reduced, providing a shoulder 16 engaging a part of the casing 1 to which the same is splined at 17. The gear 15 carries a snap ring 18 or the like forming with the shoulder 16 substantially a groove receiving the splined portion of the casing 1 so as to prevent relative longitudinal and rotary movement of the sun gear 15. The sun gear 15, however, is preferably floatingly splined to the casing 1 so as to be capable of a slight relative rotary movement, permitting the sun gear to adjust itself.

The pinions 11 also mesh with the teeth 19 of a ring gear 20 having at its rear part teeth of reduced height affording a shoulder 21 and provided in spaced relation to the shoulder with a snap ring or the like 22 which, with said shoulder, forms a circumferential groove. In this groove the toothed periphery 23 of an overdrive centrifugal clutch core 24 is fixedly splined, so that for practical purposes the ring gear and clutch core may be regarded as substantially integrally connected.

The core 24 is journaled on the pinion cage 6 and, to this end, there is provided a clutch core hub 25 having a reduced forward end portion providing a bearing for the inner periphery of the core and a clutch core hub bushing 26 positioned between a rearwardly extended sleeve 27 on the cage 6 and the hub 25. The core 24 provides outwardly of its inner periphery a shoulder against which the enlarged portion 28 of the hub 25 abuts. This hub at its rear part is flanged outwardly as shown at 29, where it engages a thrust washer 30, the core 24 being held in spaced relation to a forward part of the cage 6 by another thrust washer 31.

The centrifugal clutch of which the core 24 forms a part may be of any suitable construction, and it is to be understood that the details of the centrifugal clutch construction herein disclosed are presented for illustrative purposes only. The core 24 is accordingly provided with a rearwardly extending portion 32 having preferably diametrically opposed slots 33 in which are slidably fitted the centrifugally weighted ratchet ends 34 of complemental clutch pawls 35. Each pawl is provided with a tail portion 36 engageable in the slot or notch 33 opposite that receiving the head 34 of the pawl, and with the head of the other pawl, substantially fills the opening 33. Each pawl has an inner curved portion which is adapted to bear on an enlarged portion 28 of the clutch core hub 25, as will be seen in Figs. 1 and 2, said hub serving as a means limiting the inward movement of the pawl heads.

The pawls are urged inward by springs 37, each bearing on a lug 38 extending outwardly from each pawl, and at the other end against an adjusting washer engaging the head of an adjusting bolt 39 extending loosely through the lug 38 and threaded at 40 into the clutch core 24. The spring 37 and head of the bolt 39 together with the intervening adjusting washer 39a are telescopically received in the bore 40a of the clutch core and accidental maladjustment is obviated by providing a keyway 41 in which the washer projection or key 42 is longitudinally slidable but not rotatable. The heads 34 and tails 36 of the pawls 35 are so dimensioned as to slidingly engage each other and the walls of the slots 33. The springs 37 are so adjusted as to equalize retracting pressure on the pawls, and to allow the stem to be moved outwardly by centrifugal force equal distances.

The centrifugal clutch sleeve or shell 43 has a forwardly extending portion 44 provided with one or more sets of opposed slots 45 adapted to receive the pawl heads 34 when the centrifugal force acting thereupon urges them outward against the resistance of the springs 37. The portion 44 surrounds the clutch core 24, and may be so formed as to have bearing engagement with the core 24 at all times, although if desired the parts could be made with radial clearance therebetween. By providing the bearing engagement, however, the shell 43 is both supported and guided by the core.

The shell 43 at a rear part 46 thereof is slidably splined at 47 to a free wheel clutch shell 48 secured to or integrally united with the overdrive main shaft 49. The shaft 49 is preferably axially aligned with the shaft 5 and journaled thereon at 50. The shaft 49 is also journaled in the rear part of the casing 1 as shown at 51, and terminates outside of the casing in a coupling flange 52 for universal or other connection to the propeller shaft (not shown).

A speedometer operating mechanism actuated by the overdrive main shaft 49 is shown at 53.

The free wheel clutch structure associated with the shell 48 may be of any suitable construction and, in the illustrated embodiment found in Fig. 1, comprises a free wheel cam 54 having cam surfaces formed on its outer periphery to cooperate with the cam rollers 55 engageable with the inner periphery of the shell 48, all operating in a manner well known in the art. The cam 54 is splined at 56 to the drive shaft 5.

A jaw clutch hub 57 is splined at 58 to the drive shaft 5 and is provided with clutch teeth 59 adapted, when free, to be disposed in the inner peripheral space 60 formed in the clutch sleeve 43 between the rear spline teeth 47 thereof and the forward clutch teeth 61 complemental to the teeth 59.

When the parts are arranged as shown in Fig. 1, and the shaft 5 is rotated in the forward direction as indicated by the reference character 5a at low speed the centrifugal force is insufficient to throw the centrifugal weights 34. The sleeve 43 is then not connected with the drive shaft 5, the overdrive main shaft 49 being driven from the drive shaft 5 solely through the one-way overrunning clutch rollers 55, in a one-to-one speed ratio.

It will be observed that when the drive shaft is rotated, the ring gear 20 and associated centrifugal clutch core 24 are rotated in the same direction and at an increased speed, in accordance with the well-known principle of planetary gearing embodying a stationary sun gear and in which the planet carrier or cage 6 is the driving instrumentality. Accordingly when the shaft 5 is rotated at low speed, even though the ring gear 20 is rotated faster than the shaft 5, the pawls bearing the weights 34 and the springs 37 are so designed as to successfully resist the centrifugal force, preventing throwing out the weights 34.

When the speed of the shaft 5 is such as to cause the increased speed of the clutch core 24 to induce sufficient centrifugal force acting upon the weights 34 to force them into engagement with the forepart 44 of the clutch sleeve 43, and the sleeve 43 is arranged as shown in Fig. 1, the initial step is taken in establishment of an overdrive between the shaft 5 and the shaft 49. At this point, let us assume that the overdrive main shaft 49 is being driven directly from the drive shaft 5 through the overrunning clutch rollers 55. Consequently the sleeve 43 is rotating at the speed of the shaft 5 while the core 24 is rotating in the same direction but at an increased speed due to the planetary action as explained.

Each pawl 34 is chamfered or relieved at the leading portion 34a of its outer terminal, providing a cam surface which enables the pawl to slip by the leading wall 45a of each pawl slot or opening 45 in the forepart of the sleeve 43, so long as the shaft 5 is driving the clutch core faster than the driven shaft 49. This constitutes in effect a pawl and ratchet assembly.

By slowing up the shaft 5, as by releasing the accelerator pedal on a motor vehicle equipped with this construction, for example, the speed of the core 24 will drop very appreciably in a short time as the engine slows down, and as a consequence the sleeve 43 will free wheel by virtue of the automatic release of the rollers 55, so that in this short time a point is reached at which the clutch core 24 is substantially synchronized with or its speed is below the speed of the sleeve 43. Should synchronism naturally occur when the pawl heads are positioned to enter the slots 45, the heads will enter the slots under centrifugal force which, even at this reduced speed of the core, is sufficient to throw out the heads. Should synchronism occur when the heads are in engagement with the inner surface of the forepart 44 of the sleeve 43, the trailing edges 34b will ride thereon as the engine continues to slow down, until said edges abut the trailing walls 45b of the slots 45, allowing the pawl heads to be thrown into the slots 45 to positively clutch the core 24 to the clutch sleeve 43.

From this point it will be clear that when the accelerator pedal is again depressed, the drive will be from the drive shaft 5 through the planetary cage 6, the planet gears 11 rotating about the stationary sun gear 15 and thereby overdriving the ring gear 20, core 24, sleeve 43 and shaft 49, the last four parts being locked together by the centrifugal clutch to rotate as a unit. Moreover, inasmuch as the maximum movement of the sleeve 43 in advance of the core 24 is the angle between successive slots 45, the difference in speed at the end of such relative movement will not be so great as to cause any appreciable or perceptible jar of the trailing portions 34b of the heads 34 upon engagement with the walls 45b of the slots 45. In practice, when the speed of the drive shaft 5 has reached such a point as to cause centrifugal force to hold the pawls outwardly against the inner periphery of the sleeve 43, the establishment of the centrifugally clutched condition may be effected in a very short time by momentarily releasing the accelerator pedal. This is true because of the fact that the engine speed drops very precipitously when the source of power is removed.

While the mechanism is in the overdrive condition, the shaft 49 is overrunning the shaft 5, by virtue of the one-way clutch rollers 55.

After the overdrive connection has been established, should the speed of the shaft 49 fall to such an extent that the centrifugal force and friction acting on the pawl heads 34 will no longer overcome the retractive force of the springs 37, the pawls will be retracted. Thereafter, when the shaft 5 is not driving, the shaft 49 will free wheel as before, and when the drive shaft 5 again drives, the direct drive of the shaft 49 through the clutch rollers 55 is established preparatory to re-engagement of the centrifugal clutch.

When the overdrive connection is established and the accelerator pedal is released, the engine serves as a brake as it is driven by the momentum from the driven shaft 49, until the low speed at which the centrifugal clutch becomes disconnected is reached.

As has been pointed out, the clutch sleeve 43 is shiftable axially by virtue of the fact that it is slidably splined as at 47 to the overdrive main shaft 49. Accordingly when the sleeve 43 is shifted to the right as seen in Fig. 1 at 43a, interlocking the teeth 61 thereof with the teeth 59 of the clutch hub 57, the free wheel clutch including the rollers 55 is short-circuited, and the shafts 5 and 49 are locked in a two-way direct drive connection. It is to be noted from Fig. 1, that the forward wall 63 of each opening 45 in the sleeve 43 is positioned in advance of the front wall 64 of the pawl head 34 less than the corresponding clearance between the clutch teeth 59 and 61. It is also to be noted that when the sleeve 43 is shifted to the right as seen in Fig. 1 until the wall 63 is slightly to the right of the wall 64, so as to prevent the heads 34 from flying out into the slots 45, the teeth 61 and 59 are not yet engaged. It follows from this that with the illustrated construction it is impossible for the centrifugal clutch and the jaw clutch teeth 61 and 59 to be engaged at the same time. If such plural engagement were permitted, breakage would occur because the sun gear 15 is held stationary by the casing 1. That is, under such circumstances, the rear gear 20 would be locked with the cage 6 to the drive shaft 5, so that the planetary gears would be locked and since the sun gear 15 is stationary with the casing 1, it would follow that breakage would occur.

Thus it will be seen that when the sleeve 43 is arranged in a position where it can receive the weights 34, the lockout clutch teeth 61 and 59 cannot be engaged, and when the lockout clutch is engaged, the centrifugal clutch cannot be engaged.

It is to be noted that the sleeve 43 is moved to the right, viewing Fig. 1, in order to clutch it to the clutch hub 57, thereby locking the mechanism in a two-way direct drive. Then when the mechanism is driven by the momentum of the vehicle or from any source of power acting on the overdrive main shaft 49, the engine associated with the shaft 5 will act as a brake.

It is to be observed also that when the above described overdrive construction is applied to the rear of a change speed transmission in which movement of a shift rail to the rear establishes a change to reverse gear, the movement of such shift rail may be transmitted directly to the clutch sleeve 43, moving the same also to the rear and bringing the teeth 59 and 61 into interengagement. It will be understood that such clutching action is necessary in order to circumvent the free wheel clutch so that when the shaft 5 is rotated in the reverse direction, that is, in the direction opposite to that shown at 5a in Fig. 1, the shaft 49 will also rotate reversely and turn the driving wheels accordingly. It is desirable that the lockout be effected automatically upon shift of the main transmission to reverse, and that the lockout clutch be capable of operation independently of the shift of the main transmission to reverse, i. e., so that the two-way coupling between the shafts 5 and 49 may be employed in any forward speed. In the case of the automatic clutching consequent upon the shift to reverse, it is desirable that a minimum of parts be employed, and for this reason it will be noted, as pointed out above, that the sleeve 43 is moved in the same direction as the shift to effect reverse speed.

The sleeve 43 is accordingly provided with a shift fork groove 65 receiving the fork 66 which, as will be seen more clearly in Fig. 3, telescopically receives the stem 67 of a reverse lockup plunger 68. The plunger 68 has a shoulder 69 abutting the fork 66, and slides longitudinally in the casing wall and a bearing 70 suitably supported from the casing. The rod extends in general parallelism to the axis of the shaft 5, and its forward end 71 is engageable with the rear end 72 of the shift rail 73 employed for shifting the low and reverse gear 74 by means of the shift fork 75. The shift rail 73 is shown in its neutral position in Fig. 3, and it will be observed that when the same is shifted to mesh the gear 74 with the reverse idler 76 so as to be rotated by the reverse gear 77, which may be mounted on the countershaft of a main transmission, to the position shown in dotted lines at 72, the rod 68 will also be shifted to the rear, so as to move the fork 66 and thereby shift the clutch sleeve 43 reversely to bring about a clutching of the teeth 59 and 61. Inasmuch as the shift to reverse occurs when the car is substantially at a standstill, the movement of the sleeve 43 to its reverse position will not be interfered with by the clutch pawls 35 since they will be held inwardly by the springs 37.

In order to automatically return the sleeve 43 to its forward, unlocked position, the fork 66 comprises a stem and a U extension 78, the arms 79 and 80 thereof telescopically receiving the reduced stud portion 81 carrying the thrust collar 82. Between the arm 79 and the collar 82 is located a retracter spring 83. During reverse movement of the reverse lockup plunger 68, the overdrive shift rail 84 carrying the stem 81 is held stationary by the spring pressed poppet 85 engaging in a rear recess or cavity 86a in the rail 84. It will be appreciated that in the interest of ease of manufacture, such recess may be milled circumferentially, but for the purpose of the invention it could be a spherical or like cavity as shown. Now it will be observed that when the plunger 68 is shifted to its reverse position, the overdrive shift rail 84 is held stationary and accordingly the fork 66 compresses the retractor spring 83 between the arm 79 and the collar 82. When the reverse shift rail 73 of the main transmission is returned to the full line position shown in Fig. 3, it will be appreciated that the retractor spring 83 will cause the fork 66 to follow, moving the lockup plunger 68 with it to its full line position.

It is desirable that the overdrive be cut out at will, and accordingly an overdrive control rock shaft 87 is rotatably supported by the casing and is longitudinally fixed by the pin 88 projecting into a circumferential groove 89 to the shaft. The shaft 87 has a crank 90 carrying a pin 91 slidably received in a transverse slot 92 in the rail 84.

The shaft 87 projects outwardly of the casing at 93 and is flattened at one or more places 94 to fit in a correspondingly shaped hole in the actuating arm 96, and to provide one or more shoulders against which the arm abuts. The shaft 87 is reduced and threaded at 97 and receives a washer and nut assembly which securely hold the arm 96 on the shaft. By virtue of the flattened portion 94, the shaft and arm are caused to rotate together. The arm 96 extends substantially beyond the shaft 87 and is connected preferably pivotally at 99 to a Bowden wire 100 or the like preferably extending to the dash board or other suitable place where it is readily accessible to the operator who may then operate it at will when the main transmission is not in reverse gear. Thus, viewing Fig. 3, when the wire 100 is shifted to the left, the shaft 87 will be rocked in the direction indicated by the arrow 101, thereby swinging the crank pin 91 in the direction shown by the arrow 102 (inasmuch as the arm 90 extends upwardly and the arm 96 extends downwardly), thereby shifting the rail 84 to the right, overcoming the pressure on the poppet 85, until the latter is received in the second recess 86b. When the rail 84 is thus shifted, it moves the fork 66 and consequently the clutch sleeve 43, preventing action of the centrifugal clutch and clutching together the teeth 59 and 61, so that a two-way one-to-one drive between the shafts 5 and 49 is established. By thereafter moving the Bowden wire 100 to the right viewing Fig. 3, obviously a retraction of the rail 84 to the position shown in Fig. 3, and a consequent release of the clutch 61, 59, will be effected so that, thereafter, in forward speed the vehicle may be driven in the overdrive condition when the speed of the engine warrants it.

It will be observed that the Bowden wire and associated structure affords assistance to the pressure on the poppet 85, tending to hold the shift rail 84 stationary when the transmission reverse shift rail 73 shifts the fork 66 reversely.

In Fig. 5 is illustrated a modified overdrive lockup construction which, with the exception of the relative position of the two-way clutch teeth and the thrust transmitting structure, is quite similar to the construction described in connection with Fig. 1.

In the previously described form of the invention, the clutch hub 57 is arranged to be engaged by the clutch sleeve upon rearward movement of the latter. In Fig. 5, it will be observed that the clutch hub 57a, splined at 58a to the shaft 5a, is arranged in advance of the free wheel shell 49a, and also with its clutch teeth 59a in advance of the clutch teeth 61a of the clutch sleeve 8 when the clutch sleeve 43a is in the overdrive position. The sleeve 43a at such time is in its rearmost position and is adapted to be shifted forwardly to engage the teeth 59a and 61a to establish a two-way one-to-one drive between the shafts 5a and 49a, at the same time shifting the centrifugal clutch pawl receiving slots 45c to positions where they cannot receive the centrifugal clutch pawls 35a. With this construction, there is no need to provide an extra set of teeth for clutching purposes on the sleeve. However, due to the fact that the sleeve 43a is moved forwardly to engage the teeth 59a, 61a, and this clutching action is necessary when shifting the main transmission into reverse gear, and since the latter shift is effected by a rearward movement, provision is made for automatically shifting the sleeve 43a forward when the main transmission reverse shift rail is moved rearwardly.

Accordingly there is mounted in the casing 1a a shift fork 103 engageable in a suitable groove 104 in the sleeve 43a and carrying a pin 105 receivable in a slot 106 in one end of a lever 107, pivoted to the casing at 108 and having its other end 109 engageable with the rear end 110 of a reverse lockup plunger 111 suitably supported in the casing. The forward end 112 of the plunger 111 is engageable by the rear end of a reverse shift rail 73a. The parts just referred to are shown in full lines in the arrangement when the main transmission is in neutral or in any forward speed, and the dotted lines show the arrangement when the clutch hub 57a is clutched to the clutch sleeve 43a, a condition which obtains whenever the main transmission is in reverse gear and which may occur at the will of the operator in any other setting of the main transmission.

The fork 103 has a sleeve 113 slidably received on a second sleeve 114 and on the reduced portion 115 of an overdrive shift rail 116. The rail 116 is longitudinally slidably supported at its enlarged portion 117 directly by the casing and at its reduced portion 115 by the sleeve 114. The sleeve 114 is held in fixed relation to the casing by a set pin 118. A spring 119 is compressed between the sleeve 114 and an inwardly projecting flange 120 on the fork 103, said flange being held by the spring against the shoulder 121 at the juncture of the reduced and enlarged portions 115 and 117, respectively, of the rail 116. Movement of the rail 116 and accordingly the fork 103 in one direction, i. e., to the right as seen in Figs. 4 and 5, beyond the positions there shown, is prevented by the collar 122 carried by the reduced portion 115 of the shift rail and engaging a shoulder 123 of the sleeve 114. It will be observed, accordingly, that the spring 119 constantly urges the parts to the full line positions, so that when the main transmission shift rail 73a is moved forward to change the gear setting from reverse to neutral, said spring returns the parts from the dotted line positions to the full line positions.

It will be seen from the above that movement of the shift rail 73a to establish reverse gear in the main transmission will result in a corresponding forward movement of the clutch sleeve 43a, moving said sleeve forward (to the left in Fig. 5) so as to block outward movement of the pawls 35a and at the same time bringing the teeth 61a of the sleeve into a positive two-way clutching engagement with the teeth 59a of the clutch hub 57a. When the shift is made back to neutral, the sleeve 43a is shifted rearwardly as explained above, separating the teeth 59a and 61a and bringing the slots 45c in positions to receive the pawls 35a for the overdrive.

It will be observed that the proximity of the rear wall 123 of each slot 45c to the radial path of the pawls 35a is such that said pawls will be blocked before the teeth 59a and 61a are allowed to come into interengagement, and likewise said teeth will be separated before the pawls are able to move into the slots 45c.

The free wheel clutch including the rollers 55a and the remainder of the structure including the planetary system operate in substantially the same way as the structure previously described.

For manual shift of the lockout clutch sleeve 43a, there is provided a rock shaft 125 journaled in the casing 1a and held against substantial longitudinal movement by a set pin 126. The shaft 125 has an upwardly extending arm provided with a crank pin 127 in the transverse slot 128 in the shift rail 116. Preferably outside of the casing there is attached to the shaft 125 an actuating arm 129 which may be operated by the driver of the car by means of a Bowden wire 130 suitably connected to the dash board or other readily available place.

The operation of this structure will be clear upon reference to the previous explanation in connection with the form of the invention shown in Figs. 1, 2 and 3. When the sleeve 43a is shifted in response to the establishment of reverse gear in the main transmission, the spring 119 is compressed between the flange 120 and the sleeve 114, without affecting the shift rail 116. The spring 119 automatically returns the sleeve 43a to its full line position. When the manual shift of the rail 116 is effected, the fork 103 is moved by the shoulder 121, likewise compressing the spring 119. Said spring, while sufficiently strong to automatically return the sleeve 43a to the full line position, is not capable of shifting the rail 116, which is maintained against accidental movement in each of its positions by means such as a spring pressed poppet (not shown) selectively engageable in the rail recesses 131, as in the previously described form of the invention.

In view of the clearance at 60 in Fig. 1 and a like clearance in Fig. 5, it will be apparent that the shiftable sleeve member is capable of occupying a position where it prevents the throwing out of the speed-responsive elements 35 and 35a and yet is not in free wheel lockout clutching engagement with the hub 57 or 57a. It is thus apparent that the mechanism may drive selectively in the overdrive speed ratio, in the free wheel one-to-one speed ratio and in the positive two-way one-to-one drive.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In combination with driving and driven members, an overrunning clutch adapted to transmit direct drive from said driving to said driven member, an intermediate member overdriven by the driving member, a speed-responsive coupling element rotatable with said intermediate member, a clutch element on the driving member, a member mounted on the driven element of said overrunning clutch for axial shifting movement from a position in which it is adapted to be engaged by said speed-responsive element for transmitting overdrive to said driven element around said overrunning clutch, to a position wherein it is adapted to engage said clutch element so as to establish a positive direct drive between the said driving and driven members.

2. The combination with driving and driven members, of speed-responsive means driven at an overspeed by said driving member, a free wheel clutch connecting said driving and driven members independently of said speed-responsive means, and a coupling member splined to said free wheel clutch and shiftable into and out of a position to drivably receive said speed-responsive means.

3. In combination with driving and driven members, an overrunning clutch adapted to transmit direct drive from said driving to said driven member, an intermediate member overdriven by the driving member, a speed-responsive coupling element carried by said intermediate member, a clutch element on the driving member, a member mounted on the driven element of said overrunning clutch for axial shifting movement from a position in which it is adapted to be engaged by said speed-responsive element for transmitting overdrive to said driven element around said overrunning clutch, to a position wherein it is adapted to engage said clutch element so as to establish a positive direct drive between said driving and driven members.

4. The combination with driving and driven members rotatable at a predetermined speed ratio, of means including a speed-responsive element driven at a different speed ratio by said driving member, a free wheel clutch connecting said driving and driven members independently of said element, and a coupling member drivably engageable with said element and splined to a driven part of said clutch and in bearing relation to said means.

5. In combination with driving and driven members, an overrunning clutch adapted to transmit direct drive from said driving to said driven member, an intermediate member, planetary gearing for overdriving said intermediate member from said driving member, a speed-responsive coupling element carried by said intermediate member, a clutch element on the driving member, a member mounted on the driven element of said overrunning clutch for axial shifting movement from a position in which it is adapted to be engaged by said speed-responsive element for transmitting overdrive to said driven element around said overrunning clutch, to a position wherein it is adapted to engage said clutch element so as to establish a positive direct drive between said driving and driven members.

6. In combination with driving and driven members, an overrunning clutch adapted to transmit direct drive from said driving to said driven member, an intermediate member overdriven by the driving member, a speed-responsive coupling element rotatable with said intermediate member, a clutch element on the driving member, a member mounted on the driven element of said overrunning clutch for axial shifting movement from a position in which it is adapted to be engaged by said speed-responsive element for transmitting overdrive to said driven element around said overrunning clutch, to a position wherein it is adapted to engage said clutch element so as to establish a positive direct drive between the said driving and driven members and to restrain said speed-responsive coupling element from assuming coupling position.

7. The combination with driving and driven members and an intermediate member, driven by one of the aforesaid members at a different speed than said one of the members, of torque-transmitting means rotatable with said intermediate member, a free wheel clutch having driving and driven parts between said driving and driven members and independent of said means, the driven part of said clutch being connected to said driven member, a coupling member slidably splined on said part and movable into and out of cooperative relation to said means, and cooperative clutch means on said driving and driven member for providing a two-way one-to-one drive between said driving and driven members, said clutch means being engageable when said coupling member is moved out of said relation.

8. The combination with driving and driven members and an intermediate member, driven by one of the aforesaid members at a different speed than said one of the members, of torque-transmitting means rotatable with said intermediate member, a free wheel clutch having driving and driven parts between said driving and driven members and independent of said means, the driven part of said free wheel clutch being connected to said driven member, a coupling member slidably splined on said part and movable into and out of cooperative relation to said means, cooperative clutch means on said driving and driven members for providing a two-way one-to-one drive between said driving and driven members, said clutch means being engageable when said coupling member is moved in a direction out of said relation, means shiftable in said direction to establish a reverse drive for said driving member, and means actuated by said shiftable means to move said coupling member in said direction.

HAROLD E. CARNAGUA.